Jan. 24, 1961   R. LEDUC   2,969,044
HYDRAULIC VALVE AND SERVO-SYSTEMS
Filed Nov. 4, 1958   2 Sheets-Sheet 1

Inventor:
René Leduc
by Michael S. Striker
Attorney

Jan. 24, 1961  R. LEDUC  2,969,044
HYDRAULIC VALVE AND SERVO-SYSTEMS
Filed Nov. 4, 1958  2 Sheets-Sheet 2

Inventor:
René Leduc
by:
Michael S. Striker
Attorney

United States Patent Office 2,969,044
Patented Jan. 24, 1961

2,969,044

HYDRAULIC VALVE AND SERVO-SYSTEMS

René Leduc, 23 Rue Henri Cloppet, Le Vesinet, France

Filed Nov. 4, 1958, Ser. No. 771,839

Claims priority, application France Nov. 5, 1957

6 Claims. (Cl. 121—41)

This invention relates to hydraulic valves more especially for incorporation in hydraulic servo-controls, and to hydraulic servo-controls incorporating such valves, for use more especially, but not exclusively, in the aeronautical and motor vehicle fields.

To avoid confusion in what follows, the term "valve" will be used in a restricted sense to describe a means for opening and closing a single orifice or port; and a device for directing a liquid along alternative paths, which must necessarily comprise one or more such ports each controlled by a "valve" as above defined, will be referred to as a "distributor." In referring to a hydraulic servo-control system the following terms will also be used:

"Input member," to define the member acted on by the human or automatic operator to bring about the required control action;

"Output member," to define the member which actually performs the control action;

"Actuator," to define a motor device, e.g. a double-acting hydraulic jack, whose movable member constitutes or controls the output member;

"Pilot distributor," to define the device which is controlled by the input member and controls the distribution of liquid to and from an actuator; and "Hydraulic relay," to define a device comprising an intermediate actuator and a second distributor actuated thereby, interposed between the pilot distributor and the output actuator (i.e. the actuator whose movable member is the output member) for the purpose of power amplification.

The advantages of using ball-type valves in hydraulic servo-controls, in respect of reliability, high power development and reduction of lost motion among other things, are well recognised. They are liable, however, to entail unacceptable break-out forces and input forces generally, which arise from (a) mechanical friction; and (b) the efforts required to open the valves.

The problem of reducing friction to practically nil may be considered as satisfactorily solved; that reducing the valve-opening efforts to acceptably low values is less tractable, and has hitherto been met by introducing a hydraulic relay.

An object of this invention is a hydraulic valve requiring negligible effort to open it irrespective of the size of the port it controls and of the pressure difference across it.

A more especial object of the invention is a hydraulic servo-valve in which a ball-valve of small capacity pilots a poppet-type valve actuated by the pressure of the liquid on its inlet side and having a follow-up characteristic, the ball-seating being in the valve poppet itself, so that the ball becomes re-seated when the "lift" of the poppet equals that of the ball, the movement of the poppet being damped by leakage through a calibrated leak-path.

A further object of the invention is a valve as defined in the last preceding paragraph, in which the poppet is spring-loaded in the direction for seating it and is integral with a piston of greater diameter than the valve-seating sliding in a blind cylinder, whose open end communicates with the inlet side of the valve and whose blind end constitutes a closed chamber which can be vented to the outlet side of the valve by unseating the ball, the latter action being effected by a push rod extending, with clearance through an axial bore in the piston and valve to the outlet side of the valve and the push-rod being actuated by a cam surface on a displaceable control member, and in which the above-mentioned leak-path is provided by a clearance between the piston and the cylinder wall.

When the ball is unseated to vent the said chamber the inlet pressure acting on the face of the piston remote from the "closed" chamber unseats the poppet against the effort of its seating spring, the displacement of the poppet being limited by re-seating of the ball when the piston has "caught up with it."

The above-mentioned cam surface may have a profile of progressively increasing steepness, the advantages of which are hereinafter explained.

The rapidity and smoothness of response of the valve are determined by the dimensions of the "leak-path," by suitable selection of which the response characteristics of the valve can readily be predetermined.

Yet another object of the invention is a positional-correspondence hydraulic servo-control system incorporating one or more hydraulic valves as above described actuated by a cam surface or surfaces on the input member of the pilot distributor which controls the output actuator directly without intervention of a hydraulic relay. Elimination of hydraulic relays is desirable since, besides adding to the weight, cumbrousness and complication of the system, they tend to make its responses too sluggish.

In such hydraulic servo-control system, an output actuator of high power can be controlled by substantially negligible input efforts, such for instance as can be supplied by an electromagnetic input actuator excitable by very small currents, without intervention of an electromagnetic relay.

In a preferred form of construction of such a hydraulic servo-control system, the pilot distributor is embodied in the piston (constituting the output member) of a double-acting hydraulic jack (constituting the output actuator).

How these objects and others as may hereinafter appear are achieved and how the invention may be carried into practise, will be better understood from the following description, having reference to the accompanying drawings, of embodiments of the valve and of a servo-control system according to the invention, which are given by way of example only and without implied limitation of the scope of the invention, which is defined in the hereto appended claims.

Figure 1:
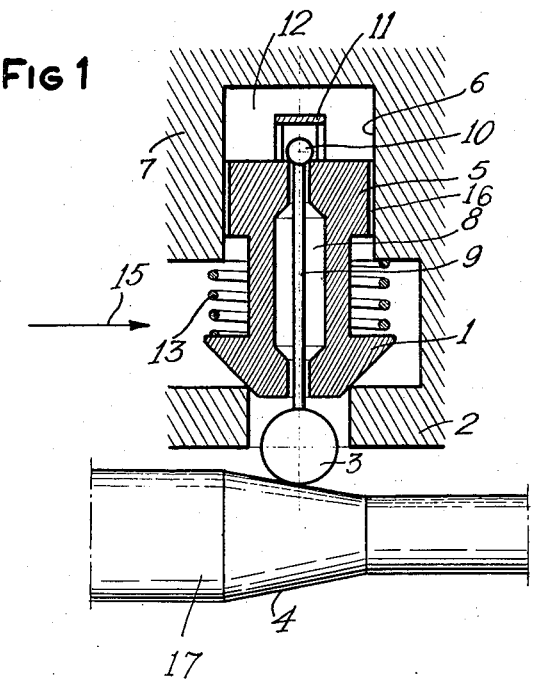
Figure 1 is a sectional view of a valve.

The valve illustrated in Figure 1 comprises a poppet 1 seatable on a seating 2 and situated on the inlet side, indicated by arrow 15, of the seating. The poppet 1 is formed integrally with a piston 5 of greater diameter than the seating 2, which piston slides, with clearance 16, in a blind cylinder 6, which is formed in the valve body 7 and whose open end communicates with the inlet chamber. The poppet 1 is loaded, in the direction for seating it, by a spring 13.

The blind end of cylinder 6 forms a chamber 12 normally enclosed, except for the leak-path provided by the clearance 16, by the face of a piston 5 remote from the poppet 1. A central opening in this face of the piston forms the seating for a small ball 10 and communicates, via an axial bore 8 in the piston 5 and poppet 1 with the outlet side of the valve. Ball 10 is trapped by a stirrup 11 and is unseatable by a push-rod 9 accommodated, with clearance, in bore 8 and actuated through an intervening ball 3 by a cam surface 4 on a rod 17, which is axially slidable and constitutes the controlling member of the valve.

The operation is as follows:

As long as ball 10 is seated the spring 13 holds the poppet 1 on its seating 2 since the inlet pressure acting on the exposed (lower) face of piston 5 is opposed by the same pressure, transmitted through clearance 16 to chamber 12, acting on the opposite face of the piston; and in fact, since the area of the piston face in chamber 12 is greater, by the area of the seating 2, than that of the opposite face of the piston, the inlet pressure actively assists the spring in seating the poppet.

Displacement of rod 17 to the right as seen in the figure causes the cam 4, acting through ball 3 and push-rod 9 to unseat the ball 10, thus venting chamber 12 to the outlet side of the valve through bore 8, consequently relieving the pressure in chamber 12. The inlet pressure acting on the exposed (lower) face of piston 5 then over-comes the effort of spring 13 and unseats the poppet 1, which rises until it "catches up" the ball 10, whose initial lift is determined by the extent to which rod 17 and cam 4 are displaced.

The extent of displacement of rod 17 thus determines the "lift" of poppet 1, so that the latter is caused to "follow-up" the displacement of rod 17.

Once ball 10 is re-seated and provided the rod 17 now remains stationary the pressure in chamber 12 will be built-up again by leakage through clearance 16, but as soon as this pressure becomes great enough to overcome the effort of the pressure exerted on the lower face of the piston 5, less the effort of spring 13, and therefore to tend to re-seat the poppet 1, the ball 10 will become unseated and relieve the pressure in chamber 12, so that a new position of equilibrium is established with the poppet 1 unseated to an extent depending on the position of rod 17 relatively to the valve body 7.

When the rod 17 is returned towards its initial position so that cam 4 allows the ball 10 to descend, the effort of the pressure in chamber 12 assisted by the spring 13 will cause the piston-poppet 5, 1 to descend and follow the ball 10 until ultimately the poppet 1 is re-seated. In the "closing" phase the spring 13 ensures a smooth and progressive return of the poppet to its seating and prevents any rebound or hammering.

Both in the "opening" and "closing" phases the speed and smoothness of response of the valve to control action is governed by the characteristics of the leak-path chamber 12 through bore 8 in the opening phase and corresponding entry of liquid in the closing phase are partially compensated by flow in the opposite sense through the clearance 16 and in the absence of this compensating flow the action of the valve would be too violent. The response characteristics of the valve can therefore be regulated by appropriate selection of the leak-path dimensions.

Figure 3:
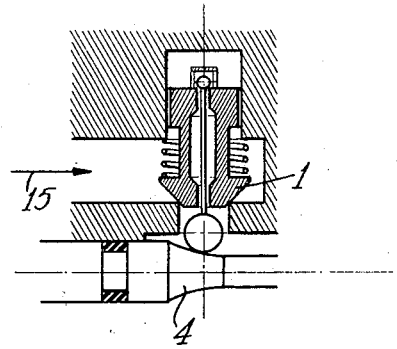
Figure 3 is a view similar to Figure 1 on a reduced scale illustrating a modification.

In Figure 1 the cam surface 4 is conical giving a linear relation between displacement of the control rod 17 and lift of the valve poppet 1. Figure 3 illustrates a modification of the valve of Figure 1 in which the cam 4 has a curved profile of progressively increasing slope such that the ratio of the lift of the poppet 1 to the displacement of the cam increases progressively as the cam is displaced to the right (as seen in the figure).

Figure 2:
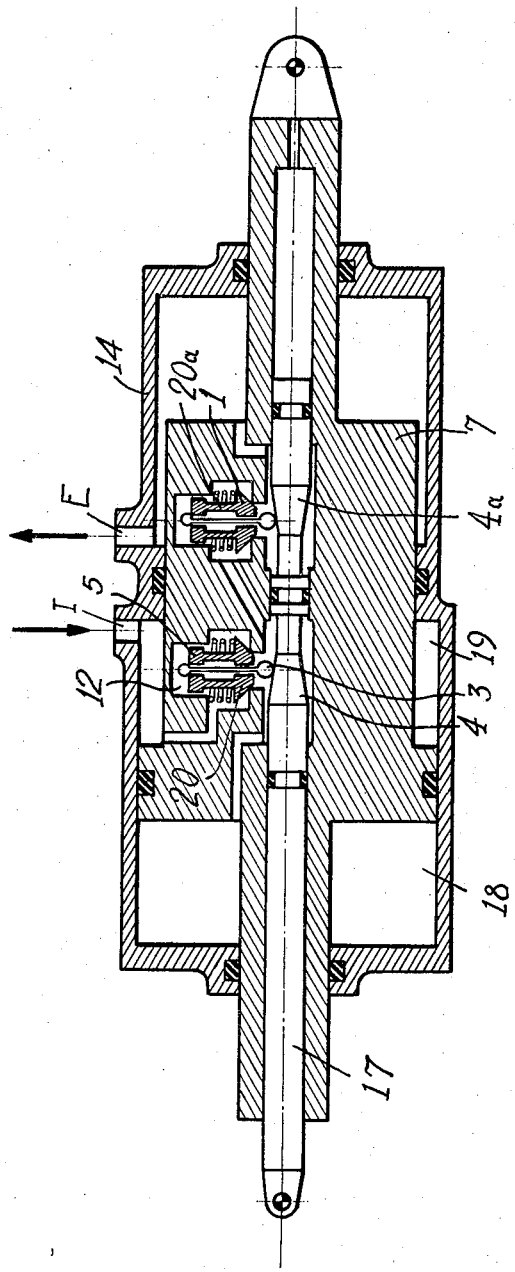
Figure 2 is a sectional view of a servo-control system.

The hydraulic servo-control system illustrated in Figure 2 is of the kind described in my United States patent specification No. 2,574,335 and illustrated in Figure 2 thereof. It comprises a double-acting hydraulic jack 14, which constitutes the output actuator and whose piston 7 having extension rods as shown constitutes the output member. Piston 7 also constitutes the body of the pilot distributor whose input member is constituted by a rod 17 slidable coaxially in piston 7 and having two cams 4, 4a, which may be conical (as in Figure 1) or of curved profile (as in Figure 3) and which respectively control valves 20, 20a as illustrated in Figure 1 and described with reference thereto. Piston 7 is a differential piston having a larger area face in the left hand chamber 18 of the jack cylinder and a smaller area face in the right hand chamber 19 of the jack cylinder. Chamber 19 communicates permanently with the pressure inlet I. Valve 20 when open connects chamber 18 to the pressure inlet I, so that the inlet pressure exerting a greater effort on the larger area face of the piston 7 than on its smaller area face displaces the piston 7 to the right as seen in the figure. Valve 20a when open connects chamber 18 to the exhaust outlet E, via an "idle" chamber at the right hand end of the jack which is always open to exhaust, so that the pressure in chamber 19 displaces the piston 7 to the left.

The cams 4, 4a face in opposite directions and are so disposed that when the input member 17 is in the neutral position both valves are closed and that displacement of member 17 from the neutral position in either sense opens one of the valves 20, 20a leaving the other closed. Displacement rightwards opens valve 20 and leftward displacement opens valve 20a. Hence the piston 7 follows the displacements of the input member 17 with hardly any lost motion.

Other things being equal, the speed at which the jack piston 7 can be displaced depends on the cross-sectional area of the passages through the valves 20 and 20a when fully open and the size of the ducts connecting the chamber 18 through them to the pressure inlet I and exhaust outlet E respectively.

By using self-servoing valves as illustrated in and described with reference to Figure 1 (or Figure 3) valve passages of adequate area to produce the highest required speed of displacement of the output member of an output jack of almost any capacity can be provided, the valves being operable by minimal efforts applied to the input member. Moreover, the valves of the present invention eliminate the instability and hunting liable to occur with high rates of output displacement in conventional hydraulic servo-controls, correct selection of the dimensions of the leak-path 16 of the valves ensuring that the deceleration of the valve poppets 1 at the end of their opening and closing travel decreases progressively and is smooth so that the valves open and close without shock.

Figure 4:
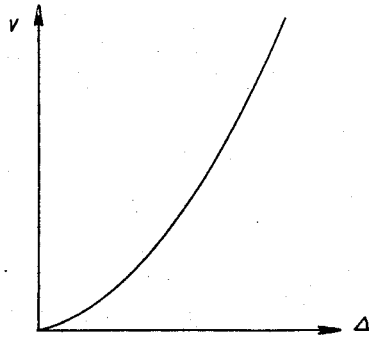
Figure 4 is a typical graph of the speed of displacement of the output member of a servo-control system as illustrated in Figure 2 and provided with valves as illustrated in Figure 3 against displacement of the input member relatively to the output member (i.e. the lost motion of the system).

By using cams 4, 4a shaped as in Figure 3, whose curvature is matched to the dimensions of the leak-paths 16 of the valves, progressive acceleration of the output member of the servo-control system during the opening phase of either valve can be achieved as illustrated in Figure 4 in which the speed V of displacement of the output member is plotted as ordinate against the displacement Δ of the input member relatively to the output member as abscissa.

I claim:

1. A valve arrangement comprising, in combination, housing means having an inlet chamber adapted to receive fluid under pressure and also having a cylindrical recess communicating with said chamber and terminating in a closed end distant from said chamber, said housing means having a wall spaced from said cylindrical recess, defining part of said inlet chamber, separating said inlet chamber from an outlet of the valve arrangement, and formed with an opening coaxial with said recess and of a smaller size than the diameter of said recess; a poppet located in said inlet chamber coaxially with said recess and having a closed position engaging an edge of said opening so that the latter edge acts as a valve seat; a piston of a larger diameter than said opening located in said cylindrical recess and having a face directed toward said wall, the diameter of said piston being less than the diameter of said cylindrical recess by a predetermined amount providing a predetermined leakage path from said inlet chamber into said recess, said piston and poppet being rigidly fixedly to each other for movement together and being formed with a passage extending axially through said piston and poppet; a valve member located in said recess at one end of said passage for closing the latter; moving means extending with substantial clearance through said passage for moving said valve member at the will of the operator toward said closed end of said recess to provide communication between said recess and outlet, whereby the fluid under pressure in said inlet chamber acts on said face of said piston to move said poppet away from said wall to an open position; and a single spring means forming the only spring means of the valve arrangement and acting exclutively on said poppet for urging the latter to its closed position.

2. A valve arrangement comprising, in combination, housing means having an inlet chamber adapted to receive fluid under pressure and also having a cylindrical recess communicating with said chamber and terminating in a closed end distant from said chamber, said housing means having a wall spaced from said cylindrical recess, defining part of said inlet chamber, separating said inlet chamber from an outlet of the valve arrangement, and formed with an opening coaxial with said recess and of a smaller size than the diameter of said recess; a poppet located in said inlet chamber coaxially with said recess and having a closed position engaging an edge of said opening so that the latter edge acts as a valve seat; a piston of a larger diameter than said opening located in said cylindrical recess and having a face directed toward said wall, the diameter of said piston being less than the diameter of said cylindrical recess by a predetermined amount providing a predetermined leakage path from said inlet chamber into said recess, said piston and poppet being rigidly fixed to each other for movement together and being formed with a passage extending axially through said piston and poppet; a valve member located in said recess at one end of said passage for closing the latter; moving means extending with substantial clearance through said passage for moving said valve member at the will of the operator toward said closed end of said recess to provide communication between said recess and outlet, whereby the fluid under pressure in said inlet chamber acts on said face of said piston to move said poppet away from said wall to an open position; and a single spring means forming the only spring means of the valve arrangement and acting exclusively on said poppet for urging the latter to its closed position, said spring means being located in its entirety in said inlet chamber.

3. A valve arrangement comprising, in combination, housing means having an inlet chamber adapted to receive fluid under pressure and also having a cylindrical recess communicating with said chamber and having a closed end distant from said chamber, said housing means having a wall spaced from said cylindrical recess, defining part of said inlet chamber, separating said inlet chamber from an outlet of the valve arrangement, and formed with an opening coaxial with said recess and of a smaller size than the diameter of said recess; a poppet located in said inlet chamber coaxially with said recess and having a closed position engaging an edge of said opening so that the latter edge acts as a valve seat; a piston of a larger diameter than said opening located in said cylindrical recess and having a face directed toward said wall, the diameter of said piston being less than the diameter of said cylindrical recess by a predetermined amount providing a predetermined leakage path from said inlet chamber into said recess, said piston and poppet being integral and formed with a passage extending axially through said piston and poppet; a valve member located in said recess at one end of said passage for closing the latter; a push rod fixed to said valve member and extending with substantial clearance from said valve member through said passage and having a free end located beyond said poppet; manually operable means cooperating with said free end of said push rod for moving the latter and said valve member therewith toward said closed end of said recess for opening said passage to provide communication between said recess and outlet whereby the fluid under pressure in said inlet chamber acts on said face of said piston to move said poppet away from said wall to an open position; and a single spring means forming the only spring means of the valve arrangement, said spring means acting exclusively on said poppet for urging the latter to its closed position.

4. A valve arrangement comprising, in combiation, housing means having an inlet chamber adapted to receive fluid under pressure and also having a cylindrical recess communicating with said chamber and having a closed end distant from said chamber, said housing means having a wall spaced from said cylindrical recess, defining part of said inlet chamber, separating said inlet chamber from an outlet of the valve arrangement, and formed with an opening coaxial with said recess and of a smaller size than the diameter of said recess; a poppet located in said inlet chamber coaxially with said recess and having a closed position engaging an edge of said opening so that the latter edge acts as a valve seat; a piston of a larger diameter than said opening located in said cylindrical recess and having a face directed toward said wall, the diameter of said piston being less than the diameter of said cylindrical recess by a predetermined amount providing a predetermined leakage path from said inlet chamber into said recess, said piston and poppet being integral and formed with an axial passage extending through said piston and poppet; a ball valve member located in said recess at one end of said passage for closing the latter; an elongated push rod fixed to said ball valve member and extending from the latter with substantial clearance through said passage and terminating in a free end portion located beyond said poppet; manually operable means cooperating with said free end portion of said push rod for moving the latter and said ball valve member at the will of the operator toward said closed end of said recess for opening said passage to provide communication between said recess and outlet whereby the fluid under pressure in said inlet chamber acts on said face of said piston to move said poppet away from said wall to an open position; and a single spring means forming the only spring means of the valve arrangement, said spring means acting exclusively on said poppet for urging the latter to its closed position.

5. A valve arrangement comprising, in combination, housing means having an inlet chamber adapted to receive fluid under pressure and also having a cylindrical recess communicating with said chamber and terminating in a closed end distant from said chamber, said housing means having a wall spaced from said recess, defining part of said inlet chamber, separating said inlet chamber from an outlet of the valve arrangement, and formed with an opening coaxial with said recess and of a smaller size than the diameter of said recess; a poppet located in said inlet chamber coaxially with said recess and having a closed position engaging an edge of said opening so that the latter edge acts as a valve seat; a piston of a larger diameter than said opening located in said cylindrical recess and having a face directed toward said wall, the diameter of said piston being less than the diameter of said cylindrical recess by a predetermined amount providing a predetermined leakage path from said inlet chamber into said recess, said piston and poppet being rigidly fixed to each other for movement together and being formed with a passage extending axially through said piston and poppet; a valve member located in said recess at one end of said passage for closing the latter; an elongated push rod fixed to said valve member and extending from the latter with substantial clearance through said passage and terminating in a free end portion located beyond said poppet; and cam means cooperating with said free end portion of said push rod for moving the latter and said valve member therewith at the will of the operator toward said closed end of said recess, the curvature of said cam means being matched to the dimensions of said leakage path and to the cross section of said passage.

6. A valve arrangement comprising, in combination, housing means having an inlet chamber adapted to receive fluid under pressure and also having a cylindrical recess communicating with said chamber and terminating in a closed end distant from said chamber, said housing means having a wall spaced from said recess, defining part of said inlet chamber, separating said inlet chamber from an outlet of the valve arrangement, and formed with an opening coaxial with said recess and of a smaller size than the diameter of said recess; a poppet located in said inlet chamber coaxially with said recess and having a closed position engaging an edge of said opening so that the latter edge acts as a valve seat; a piston of a larger diameter than said opening located in said cylindrical recess and having a face directed toward said wall, the diameter of said piston being less than the diameter of said cylindrical recess by a predetermined amount providing a predetermined leakage path from said inlet chamber into said recess, said piston and poppet being rigidly fixed to each other for movement together and being formed with a passage extending axially through said piston and poppet; a valve member located in said recess at one end of said passage for closing the latter; an elongated push rod fixed to said valve member and extending from the latter with substantial clearance through said passage and terminating in a free end portion located beyond said poppet; cam means cooperating with said free end portion of said push rod for moving the latter and said valve member therewith at the will of the operator toward said closed end of said recess, the curvature of said cam means being matched to the dimensions of said leakage path and to the cross section of said passage; and a single spring means forming the only spring means of the valve arrangement and acting exclusively on said poppet for urging the latter to its closed position.

References Cited in the file of this patent
UNITED STATES PATENTS

| | | |
|---|---|---|
| 2,345,306 | Van der Werff | Mar. 3, 1944 |
| 2,574,335 | Leduc | Nov. 6, 1951 |
| 2,758,811 | Peterson | Aug. 14, 1956 |
| 2,821,211 | Wittren | Jan. 28, 1958 |
| 2,825,361 | Seljos | Mar. 4, 1958 |